United States Patent Office 3,134,666
Patented May 26, 1964

3,134,666
HERBICIDAL COMPOSITIONS AND METHODS
Dougal Harold McRae, Hatboro, Pa., assignor to Rohm & Haas Company, Philadelphia, Pa., a corporation of Delaware
No Drawing. Filed Aug. 31, 1961, Ser. No. 135,132
12 Claims. (Cl. 71—2.7)

This invention relates to herbicidal compositions. More particularly, it concerns compositions comprising mixtures of 3',4'-dichloropropionanilide and thiolcarbamates as herein defined.

The farmer, horticulturist, or any other grower of useful and desirable plants needs an arsenal of herbicides to fit a large number of situations wherein undesirable vegetation requires controlling. An ideal herbicide would be one which gives full season selective weed control with a single application. It should be able to control all common weeds, killing them as the seed, the germinant seed, the seedling, or the established plant and at the same time various types of crops would be tolerant. As with ideals in general, it could not be expected that such an ideal herbicide would be readily achieved, if ever. Certainly, today no herbicide exists which comes even close to these requirements. Unexpectedly, we have found a way to approach this ideal by admixing two types of herbicidal materials. The new and improved herbicidal properties of the resulting composition could not be predicted on the basis of the known properties of the individual components.

The preparation and herbicidal use of 3',4'-dichloropropionanilide have been described in application Serial No. 714,947, filed February 13, 1958. The reaction of 3,4-dichloroaniline with propionyl halides, propionic anhydride, or propionic acid produces 3',4'-dichloropropionanilide, a compound which is outstandingly effective as a selective weedicide. A formulation of 3',4'-dichloropropionanilide is available commercially under the trade name of STAM F-34. This is used as a selective herbicide for weeds among cereal grains including rice, several solanaceous crops, some perennial legumes, corn, flax, turf, strawberries, sugar cane, pineapples, and other crops. Control of grassy weeds and a number of dicotyledonous weeds is obtained by application to the weeds shortly after their emergence. It has been found necessary to kill the weeds before they become woody. Over a growing season this may require repeated and sometimes frequent applications.

With most types of herbicides, it has been found difficult if not impossible to obtain full season control of weeds with a single application. Weed seeds do not all germinate at the same time, and, depending on moisture content of the soil, competition from established crops, and other factors, there will always be new weeds appearing as germinating seedlings. It is recognized, therefore, that there is a real need to prolong herbicidal action and increase residual weed control, and in so doing the number of sprays needed per season would be reduced with a resultant economy. This need applies in general to N-3,4-dichlorophenyl or N-3-chloro-4-methylphenyl fatty acid amides. One achievement of this invention is a means of prolonging the action of herbicidal sprays containing chloroanilides, in particular 3',4'-dichloropropionanilide.

There are situations wherein it would be desirable to moderate the phytotoxicity of 3',4'-dichloropropionanilide to established economic crops and yet control weeds thereamong. In such situations, the difference between the dosage tolerated by the crop and that necessary to give adequate control of weeds in the crop is small. This margin of safety is, therefore, in rather fine balance and can be easily upset by minor changes in climate, soil, and other factors with the result of more injury to crops than is desirable. It is sought, therefore, to find herbicidal preparations wherein this margin of safety is improved; i.e., phytotoxicity to the crops is decreased while herbicidal action is increased. This is accomplished by mixing 3',4'-dichloropropionanilide with at least one thiolcarbamate in a proportion such that the desired weed control is obtained with a reduced dosage of this anilide and the phytotoxicity to the crop remains no more than for this reduced dosage of 3',4'-dichloropropionanilide if applied alone. In other words, in mixtures of 3',4'-dichloropropionanilide and a thiolcarbamate, the governing component as far as crop tolerance is concerned is the anilide. Further, by the use of such mixtures it is possible to achieve practical and economical weed control at lower rates of treatment and at less critical times of application of 3',4'-dichloropropionanilide than when this is used alone.

Various difficulties were encountered by applicant in attempts to combine 3',4'-dichloropropionanilide with other herbicides, and only a selected few types of the latter can be used to give the desired, improved herbicidal compositions. When attempts were made to combine 3',4'-dichloropropionanilide with other agents exhibiting herbicidal action, it was found that a great many of them were incompatible. Incompatibility was manifested in at least one of several ways—many times at least one of the components remained as an insoluble precipitate and no mutual solven could be found which would give a homogeneous formulation; in other cases some part or parts separated from the completed formulation, resulting in, for example, formation of a precipitated solid, or a gel or stratification into liquid layers; in some cases a chemical incompatibility would result in decomposition of at least one of the components; or a biological incompatibility would be manifested by one herbicide offsetting, at least in part, the effect of the other. Also, 3',4'-dichloropropionanilide is a relatively insoluble chemical, the formulation of which is rather exacting, and it is necessary to choose another herbicide for combining with it that would not adversely alter its solubility characteristics, and preferably one that would give increased solubility and coupling action.

Compositions meeting the above exacting requirements are achieved by mixing 3',4'-dichloropropionanilide and at least one thiolcarbamate, such as discussed in U.S. Patents No. 2,887,372, 2,901,498-9, 2,913,325-8, 2,916,369-70, and 2,992,091; also, British Patents No. 862,250 and 562,548.

In general, thiolcarbamates are used for the control of grassy and certain broadleaf weeds, but the timing of their application has been critical. Susceptible weeds include barnyardgrass, bluegrass, crabgrass, nut grass, foxtail, Johnson grass, wild oats, sandspur, deadnettle, lamb's-quarters, nodding spurge, and pigweed, whereas chickweed, wild mustard, plantain, purslane, shepherd's purse, and velvet-leaf are only mildly susceptible and wild radish, morning glory, and ragweed are resistant. Crops which have been demonstrated to have resistance are forage legumes, beans, corn, cole crops, tomatoes, eggplant, onion, radishes, strawberries, birds-foot trefoil. On the other hand, cotton, cucurbits, leafy vegetables, peas, and stock have been only fairly resistant to thiolcarbamates as heretofore applied, while barley, wheat, lima beans, buckwheat, fesque species, peppers, peppermint, rye grass, bent grass, Sudan grass, and sorghums have been susceptible. Thus, it is seen that there are weeds which are not susceptible to control by thiolcarbamates, and there are crops which are injured by them. Also, since thiolcarbamates are esters and as such are readily subject to hydrolysis or other forms of decomposition under use conditions, their chemical stability may be poor and these materials as such are then short-lived. Furthermore, in many instances excessive dosages of thiolcarbamates are required to achieve even a moderate degree of weed control. For some purposes, dosages as high as several hundred pounds per acre have been recommended.

Effective thiolcarbamates may be represented by the general formula

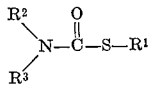

wherein $R^1$ is alkyl, alkenyl, cyanoalkyl, alkoxyalkyl, or alkylthioalkyl, these groups having not over five carbon atoms, cycloalkyl of five to six carbon atoms, benzyl, or phenyl, and when $R^2$ and $R^3$ are taken individually, $R^2$ is hydrogen or alkyl, haloalkyl, hydroxyalkyl, alkenyl, haloalkenyl, alkoxyalkyl, or cyanoalkyl, these groups having not over five carbon atoms, cycoalkyl of five to six carbon atoms, benzyl, or phenyl and $R^3$ is hydrogen or alkyl, haloalkyl, cyanoalkyl, hydroxyalkyl, alkenyl, haloalkenyl, or alkoxyalkyl, these groups having not over five carbon atoms, cycloalkyl, or furfuryl, or $R^3$ is $$-C_nH_{2n}(R^2)NC(O)SR^1$$

where $n$ has a value of two to three and $R^1$ and $R^2$ have the significance herein defined, or when $R^2$ and $R^3$ are taken together, they give a divalent aliphatic radical which when combined with the nitrogen atom forms a heterocyclic radical such as morpholino, pyrrolidino, or piperidino.

The particular thiolcarbamates selected will depend upon the particular crop which is to be treated, the kinds of weeds to be controlled, the type of soil, and other environmental factors. For the purpose of this invention, the thiolcarbamates which are liquid at room temperature are preferred, since under these conditions the thiolcarbamate readily functions as a flux or solvent for 3′,4′-dichloropropionanilide.

Representative of the above structural formula are:

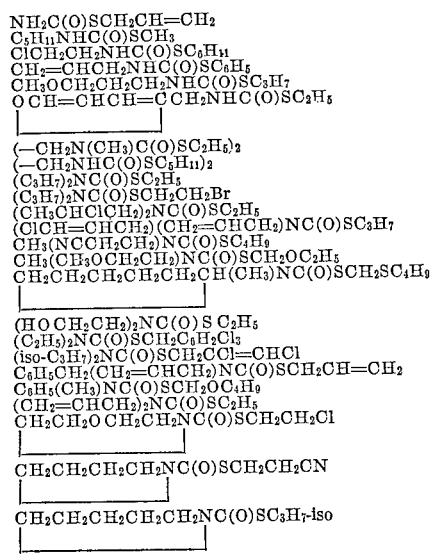

A well-known compound introduced as a commercial herbicide is ethyl N,N-di-n-propylthiolcarbamate, known as Eptam. Other thiolcarbamates have been offered commercially and experimentally.

For ready use in herbicidal applications, it is desirable to admix 3′,4′-dichloropropionanilide and at least one thiolcarbamate in formulations such as emulsion concentrates, wettable powders, granulars, or dusts. In these formulations, the ratio of 3′,4′-dichloropropionanilide to thiolcarbamate is 5:1 to 1:10 by weight but the preferred ratios are 1:1 to 1:3.

An emulsion concentrate is made by dissolving 3′,4′-dichloropropionanilide and the thiolcarbamate or mixture of thiolcarbamates in a mutual solvent to which an emulsifier or emulsifiers are added. Suitable solvents for use in preparing these emulsion concentrates may, for example, be found in the hydrocarbon, chlorinated hydrocarbon, ketone, and ester classes of organic solvents, such as xylene, naphthas, ethylene dichloride, acetone, cyclohexanone, isophorone, and dimethyl phthalate, and mixtures of these. Preferred solvents are ketones or ketone-hydrocarbon mixtures. The emulsifying agents used are surfactants of the anionic, cationic, or non-ionic types or mixtures thereof. Typical of the anionic surfactants are fatty alcohol sodium sulfates, calcium alkylbenzenesulfonates, and sodium dialkyl sulfosuccinates; typical of the cationics are (higher alkyl)dimethylbenzylammonium chlorides; and typical of non-ionics are condensation products of ethylene oxide with fatty alcohols, alkylphenols, mercaptans, or fatty acids, such as octylphenoxypolyethoxyethanol in which there are 8 to 100 ether groupings and similar polyethoxy compounds prepared with other hydrophilic groupings, including esters of long-chained fatty acids and mannitan or sorbitan, which are reacted with ethylene oxide.

For those thiolcarbamates which are liquid a solution of 3′,4′-dichloropropionanilide in the thiolcarbamate can be prepared, wherein no auxiliary solvent is necessary and emulsifier is added to such solution. This constitutes the most economic package which could be made.

Emulsion concentrates may be prepared to contain from about 1 to 6 pounds of 3′,4′-dichloropropionanilide and about 6 to 1 pounds of the thiolcarbamate per gallon.

The following compositions are typical for emulsion concentrate formulations when solvents are used.

| | Parts/100 parts total |
|---|---|
| 3′,4′-dichloropropionanilide-thiolcarbamate mixture | 20 to 75 |
| Solvent | 23 to 78 |
| Emulsifying agent | 2 to 10 |

Wettable powder formulations comprise 3′,4′-dichloropropionanilide and a thiolcarbamate, as defined, admixed in a solid carrier along with surface active agents which give this type of formulation its wettability, dispersibility, and spreading characteristics. Solid carriers which are suitable for preparing these wettable powder formulations are those which have been rendered agronomically suitable by pulverizing devices and may be either organic or inorganic in nature. Suitable organic carriers are soybean, walnut, or wood flour or tobacco dust, and suitable inorganic ones are clays of the montmorillonite (bentonite), kaolinite, or fuller's earth types; silicas such as diatomaceous earth; silicates such as talc, pyrophyllite, or alkaline earth silicates; and calcium and magnesium carbonates. A surfactant or mixture of surfactants is added in an amount of 1 to 10 percent by weight of the wettable powder formulation. Suitable dispersing agents are sodium formaldehyde-naphthalene sulfonate, sodium lignin sulfonate, or sodium N-methyl-N-higher alkyl taurates. Wetting agents useful for this purpose include higher alkylaryl sulfonates such as calcium dodecylbenzenesulfonate, long-chained alcohol sulfates, alkylphenoxyethoxyethoxyethyl sodium sulfonate, sodium dioctyl sulfosuccinate, and ethylene oxide adducts with fatty alcohols or with higher alkylphenols, such as octylphenoxypolyethoxyethanol in which there are 8 to 80 ether groupings and similar polyethoxy compounds made from stearyl alcohol. Operative sticking or spreading agents include glycerol mannitan laurate or a condensate of polyglycerol and oleic acid modified with phthalic anhydride. The active ingredient content of the wettable powders may be in the range of 20 to 80%; however, the preferred range of concentrations is 50 to 80%.

The following compositions are typical for wettable powder formulations:

| | Parts/100 parts total |
|---|---|
| Active ingredients | 20 to 80 |
| Carrier | 10 to 79 |
| Surfactant(s) | 1 to 10 |

Dust concentrates are made by incorporating the mixture of 3',4'-dichloropropionanilide and at least one thiolcarbamate into a solid carrier, such as finely powdered clays, talc, silica, and synthetic silicates, alkaline earth carbonates, and diluents of natural origin such as tobacco dust or walnut shell flour. Granular formulations are made from similar type solid carriers except that the particle size is larger, in the range of 15 to 60 mesh. A small amount of dispersing agent may be incorporated in these solid formulations. The concentration of active ingredients in these dust or granular formulations may be in the range of 2 to 15%.

It will be seen from the above that the compositions of this invention may contain 10% to 98% of carrier based on the total weight of the composition depending on whether it is in the form of an emulsion concentrate, a wettable powder, a dust, or a granular formulation.

One particularly convenient method for making solid formulations is to dissolve the 3',4'-dichloropropionanilide and the thiolcarbamate (solid thiolcarbamates are preferred) in a volatile solvent, such as acetone, apply this solution to the solid carrier with thorough mixing, and then to remove the solvent by allowing it to evaporate at either normal or reduced pressure.

Details of typical formulations are given in the following examples which are presented for purposes of illustration and not by way of limitation. Parts are by weight unless otherwise designated.

EXAMPLE 1

Forty-five parts of 3',4'-dichloropropionanilide was stirred with 45 parts of ethyl N,N-di-n-propylthiolcarbamate until it was dissolved. To the resulting brown solution was added 10 parts of an emulsifier which contained 30% of octylphenoxypolyethoxyethanol containing about 70 ethoxy groups, 30% of calcium dodecylbenzenesulfonate, 20% methanol, and 20% xylene. This gave an emulsion concentrate which contained about three and one-half pounds each of the two active ingredients per gallon.

EXAMPLE 2

An emulsion concentrate of 3',4'-dichloropropionanilide was made by dissolving 25 parts of this anilide in a solution of 53 parts of xylene, 14 parts of isophorone, 2 parts of methanol, 3 parts of the octylphenoxypolyethoxyethanol containing 70 ethoxy groups, and 3 parts of calcium dodecylbenzenesulfonate. This gave a dark brown solution to which was added 37.5 parts of ethyl N,N-di-n-propylthiolcarbamate. The resulting emulsion concentrate contained the two active agents in the ratio of 2:3.

In the same manner emulsion concentrates were made as above by substituting for the ethyl N,N-di-n-propylthiolcarbamate the same weight of any one of the following: ethyl N,N-dibutylthiolcarbamate, propyl N-ethyl-N - butylthiolcarbamate, isobutyl N,N - diethylthiolcarbamate, amyl N,N - dipropylthiolcarbamate, isopropyl N,N - pentamethylenethiolcarbamate, ethyl N - propyl-N-allylthiolcarbamate, methyl N-butyl-N-$\beta$-cyanoethylthiolcarbamate, ethyl N,N-diallylthiolcarbamate, or ethyl N,N-bis-$\beta$-hydroxyethylthiolcarbamate.

EXAMPLE 3

An emulsion concentrate was made by dissolving 50 parts of methoxymethyl N,N-di-n-propylthiolcarbamate in 45 parts of xylene and adding to this an emulsifier mixture consisting of 3.25 parts of octylphenoxypolyethoxyethanol having from 9 to 10 ethoxy groups, 0.9 part of calcium dodecylbenzenesulfonate, 0.6 part of methanol, and 0.25 part of a commercial methylated napthalene mixture. To the above product was then added 33.3 parts of 3',4'-dichloropropionanilide and the mixture agitated until a homogeneous solution resulted. Every eight pounds of this emulsion concentrate contained two pounds of 3',4'-dichloropropionanilide and three pounds of methoxymethyl N,N-di-n-propylthiolcarbamate.

EXAMPLE 4

A mixture of 45 parts of 3',4'-dichloropropionanilide, 45 parts of 2,3 - dichloroallyl N,N - diisopropylthiolcarbamate, 23 parts of isophorone, 20 parts of xylene, 3 parts of methanol, 4.5 parts of octylphenoxypolyethoxyethanol containing 70 ethoxy groups, and 4.5 parts of calcium dodecylbenzenesulfonate was stirred at room temperature to give a brown colored emulsion concentrate.

EXAMPLE 5

An emulsion concentrate was prepared by admixing 75 parts of methylthiomethyl N,N-diethylthiolcarbamate, 50 parts of 3',4'-dichloropropionanilide, 45 parts of xylene, 1 part of methanol, 2 parts of calcium dodecylbenzenesulfonate, and 2 parts of octylphenoxypolyethoxyethanol containing about 20 ethoxy groups.

EXAMPLE 6

An emulsion concentrate was made by adding 18 parts of propyl N-$\gamma$-methoxypropylthiolcarbamate and 18 parts of phenyl N-allylthiolcarbamate to 28 parts of xylene, 28 parts of isophorone, 2 parts of methanol, 3 parts of octylphenoxypolyethoxyethanol having about 80 ethoxy units, and 3 parts of calcium dodecylbenzenesulfonate with stirring. This gave a solution to which was added 36 parts of 3',4'-dichloropropionanilide and stirring was continued until this solid dissolved. The resulting emulsion concentrate had a specific gravity of about 1.03 at 25° C. and contained about 1.5 pounds of each of the two thiolcarbamates and about 3 pounds of the propionanilide per gallon.

EXAMPLE 7

An acetone solution was made by dissolving 25 parts of 3',4'-dichloropropionanilide and 25 parts of allyl thiolcarbamate in 50 parts of acetone and 3 parts of a highly purified sodium lignin sulfonate and 2 parts of octylphenoxypolyethoxyethanol having 12 ether groups. This solution was slowly sprayed onto 47 parts of a refined hydrated aluminum silicate in a ribbon blender. While the blender was thoroughly mixing the solid mass, the acetone vapors were allowed to evaporate and were removed by means of a fume hood. The solid blend was then mikropulverized to give the fine particle size desirable for a wettable powder herbicidal formulation.

EXAMPLE 8

A mixture of 25 parts of 3',4'-dichloropropionanilide, 12.5 parts of ethyl N-furfurylthiolcarbamate, 12.5 parts butyl N-3-chloroallyl-N-allylthiolcarbamate, 47 parts of natural kaolin, 3 parts of sodium formaldehyde-naphthalene sulfonate, and 5 parts of a mixture of 40 parts of octylpolyethoxyethanol having 10 ether groups adsorbed on 60 parts of magnesium carbonates was ground in a ball mill for four hours. The blended mixture was micronized in an air attrition mill. The product, a light brown solid, was a wettable powder containing 50% of active ingredients.

EXAMPLE 9

Five parts of 3'4'-dichloropropionanilide was dissolved in 5 parts of ethyl N,N-di-n-propylthiolcarbamate. This brown solution was atomized onto 90 parts of finely-particled talc while being mixed in a ribbon blender over a period of two hours. The blended solid was then mikropulverized and finally screened to give a 10% active dust formulation having an average particle size of two microns.

These herbicidal compositions may be applied broadcast to areas to be protected or applied to the environment of a growing crop, as in a narrow band. The compositions may be applied in a directed spray about a growing crop. Preferably, the compositions are applied after weeds have appeared. Generally, rates of application are from one to twelve pounds of the active ingredients per acre, but the preferred range is two to eight pounds per acre. Wettable powders and emulsion concentrates are applied as aqueous sprays; i.e., the concentrated formulations are mixed with water in a tank before spraying onto the area whereon weed control is desired. If the spraying machine is ground equipment, the usual carrier rate is 10 to 200 gallons per acre with a preferred range of 20 to 50 gallons per acre, whereas in aerial spray equipment, the more usual carrier volume is 2 to 10 gallons per acre.

A number of field tests have been conducted on the compositions of this invention in order to demonstrate the herbicidal advantages thereof. Table I gives a listing of materials tested and reported herein.

Table I
LIST OF MATERIALS TESTED

| Material: | Compound(s) |
|---|---|
| A | 3',4'-dichloropropionanilide. |
| B | Ethyl N,N-di-n-propylthiolcarbamate. |
| C | 2,3-dichloroallyl N,N-diisopropylthiolcarbamate. |
| D | Methoxymethyl N,N-di-n-propylthiolcarbamate. |
| E | A+B in ratio 2:3. |
| F | A+C in ratio 1:1. |
| G | A+D in ratio 2:3. |

The above-noted compounds were formulated as emulsion concentrates which were extended with water and applied at carrier volumes of about 50 gallons per acre.

As previously noted, there are a number of crops which are not tolerant to thiolcarbamates. One particular discovery of this invention is that under proper conditions of use the combinations of 3',4'-dichloropropionanilide with thiolcarbamates exhibit only the phytotoxicity to crops which would be predicted from the properties of 3',4'-dichloropropionanilide and none from the thiolcarbamates. Heretofore, thiolcarbamates have had to be applied at the time when the crop was planted and under these conditions cereals, for example, are not tolerant and exhibit a high degree of phytotoxicity. It has, therefore, not been practical to apply thiolcarbamates to cereals such as barley and wheat. When formulations of this invention were applied to spring wheat at the one to three leaf stage at a rate providing one pound of 3',4'-dichloropropionanilide (Material A) and two pounds of ethyl N,N-di-n-propylthiolcarbamate (Material B) per acre, practical weed control was obtained without injury to the wheat. This same outcome was observed on rice and the other agronomic plants previously mentioned which are tolerant to 3',4'-dichloropropionanilide.

Another noteworthy advantage of the compositions of this invention is that the herbicidal action or weed control is extended over a long period of time, longer than normally obtained with the individual components alone, and thus the need for repeated spray applications is eliminated. To demonstrate this, a field test summarized in Table II was conducted utilizing the cereals wheat, oats, barley, and rye. These were planted in the spring in 25-foot rows, two rows per crop, and eight-inch row spacings. Material A was applied 27 days after planting, materials B and C one day after planting, and materials E and F 37 days after planting.

In Table II the results are recorded for the percent weed control obtained at the indicated number of days after the cereals had been planted. The data are recorded separately for the control of monocotyledonous weeds (Monocots) and for dicotyledonous ones (Dicots).

It is seen that three months after planting of the cereals there was still essentially perfect control of all weeds with the compositions E and F, essentially no control with the thiolcarbamates B and C, and moderate but insufficient control with 3',4'-dichloropropionanilide. Furthermore, preparations A, E, and F gave essentially no injury to the cereals whereas B and C caused moderate to severe injury to the germinated plants.

A second field test on cereals was conducted in exactly the same manner as for that described just above except that all treatments were applied 37 days after the cereals were planted and the data were taken at the indicated times. The results are summarized in Table III.

Table II

| Composition | Pounds/acre | 56 days [1] | | 77 days [1] | | 93 days [1] | |
|---|---|---|---|---|---|---|---|
| | | Monocots, percent [2] | Dicots, percent [2] | Monocots, percent [2] | Dicots, percent [2] | Monocots, percent [2] | Dicots, percent [2] |
| A | 2 | 96 | 92 | 68 | 62 | 70 | 65 |
| B | 3 | 80 | 55 | 35 | 15 | 15 | 5 |
| C | 2 | 75 | 0 | 22 | 0 | 5 | 0 |
| E | 5 (2A+3B) | 99 | 93 | 100 | 97 | 96 | 96 |
| F | 4 (2A+2C) | 98 | 94 | 99 | 99 | 95 | 93 |

[1] Days after planting.
[2] Percent weed control in cereals.

Table III

| Composition | Pounds/acre | 56 days [1] | | 77 days [1] | | 93 days [1] | |
|---|---|---|---|---|---|---|---|
| | | Monocots, percent [2] | Dicots, percent [2] | Monocots, percent [2] | Dicots, percent [2] | Monocots, percent [2] | Dicots, percent [2] |
| A | 2 | 94 | 90 | 55 | 65 | 25 | 35 |
| B | 3 | 0 | 85 | 0 | 43 | 0 | 18 |
| C | 2 | 0 | 0 | 0 | 0 | 0 | 0 |
| E | 5 (2A+3B) | 99 | 93 | 100 | 97 | 96 | 96 |
| F | 4 (2A+2C) | 98 | 94 | 99 | 99 | 95 | 93 |

[1] Days after planting.
[2] Percent weed control in cereals.

Here again almost complete weed control was obtained with compositions E and F three months after planting whereas all treatments with individual compounds A, B, or C were essentially failing by this time. Again, no phytotoxicity to the cereals was obtained with E or F.

Under recommended conditions of use 3',4'-dichloropropionanilide applied at two pounds per acre will give 80 to 90% weed control over a period of three weeks, and the more active thiolcarbamates at three to six pounds per acre will give practical weed control up to about six weeks; however, a combination of these dosages of this propionanilide and a thiolcarbamate will give excellent weed control for three to four months, or for practically an entire season.

A field test was conducted on transplanted tomatoes with materials A, B, D, E, and G, and the results are given in Table IV.

Table IV

PERCENT WEED CONTROL IN TOMATOES

I. Compositions A, E, and G were applied 29 days after the tomatoes were transplanted, and B and D were applied one day after transplanting.

| Composition | Pounds/acre | Percent weed control of— | | | |
|---|---|---|---|---|---|
| | | Monocots [1] | Dicots [1] | Monocots [2] | Dicots [2] |
| A | 2 | 83 | 88 | 30 | 87 |
| B | 3 | 78 | 75 | 10 | 40 |
| D | 3 | 72 | 60 | 10 | 20 |
| E | 5 (2A+3B) | 99 | 100 | 75 | 85 |
| G | 5 (2A+3D) | 99 | 99 | 80 | 83 |

II. Compositions A, B, and D were applied 1 day after transplanting and E and G 29 days after transplanting

| A | 2 | 0 | 0 | 0 | 0 |
| B | 3 | 78 | 75 | 10 | 40 |
| D | 3 | 72 | 60 | 10 | 20 |
| E | 5 (2A+3B) | 99 | 100 | 75 | 85 |
| G | 5 (2A+3D) | 99 | 99 | 80 | 83 |

III. All compositions applied 29 days after transplanting

| A | 2 | 83 | 88 | 30 | 87 |
| B | 3 | 0 | 0 | 0 | 0 |
| D | 3 | 0 | 0 | 0 | 0 |
| E | 5 (2A+3B) | 99 | 100 | 75 | 85 |
| G | 5 (2A+3D) | 99 | 99 | 80 | 83 |

[1] 37 days after transplanting.
[2] 92 days after transplanting.

Again the very much prolonged activity of the combination of 3',4'-dichloropropionanilide with thiolcarbamates over the individual components is demonstrated. In Parts I and III of Table IV this is shown in particular with monocotyledonous type weeds, but with both types of weeds in Part II. In all cases there was no visible injury to the tomato plants.

The value of the combination treatments on potatoes was demonstrated in a field test in which compositions A, B, D, E, and G were used. All treatments were applied as aqueous sprays at a carrier rate of 50 gallons per acre 32 days after the potatoes were planted. The data were recorded 35 days after the treatment date and are summarized in Table V.

Table V

PERCENT WEED CONTROL IN POTATOES

| Composition | Pounds/acre | Percent weed control | |
|---|---|---|---|
| | | Monocots | Dicots |
| A | 2 | 40 | 75 |
| B | 3 | 0 | 0 |
| D | 3 | 0 | 0 |
| E | 5 (2A+3B) | 70 | 90 |
| G | 5 (2A+3D) | 75 | 80 |

NOTE.—The test was continued and three months after the treatment date practical weed control was still being obtained with combination treatments E and G, whereas treatments A, B, and D were overgrown with weeds, particularly the grassy ones.

Combinations of 3',4'-dichloropropionanilide and thiolcarbamates have been particularly valuable in situations where serious weeds such as nut grass have been a problem. Nut grass is not adequately controlled by applying to the growing plant 3',4'-dichloropropionanilide (Material A) alone or by applying to the growing plant ethyl N,N-di-n-propylthiolcarbamate (Material B) alone, but a combination of the two gives excellent control. In a test plot in which nut grass was a serious problem in potatoes, three weeks after planting the test plot was sprayed with a composition supplying three pounds of 3',4'-dichloropropionanilide and five pounds of ethyl N,N-di-n-propylthiolcarbamate per acre at a carrier volume of 50 gallons per acre. A full season's control of nut grass was obtained.

It has been established that there is a definite need for new herbicides which will exhibit high activity on weeds at low rates of application while having improved tolerance to crops, and which will have prolonged activity, thus avoiding the necessity for frequent applications.

While thiolcarbamates are useful herbicides, as heretofore used they require a critical timing of application which must be between the time seed is planted and before emergence of the seedling. Thus, the period during which thiolcarbamates are effectively applied is a matter of a very few days. When 3',4'-dichloropropionanilide is admixed with thiolcarbamates, there is a much greater leeway in timing of application. These compositions are normally applied to established plants and the major criterion is that the herbicides must be used before the weeds become differentiated; that is, woody. Under these conditions, the application of the compositions of this invention can be delayed as much as a month, for example, after planting and still excellent and prolonged weed control is achieved.

Another advantage is that it is possible to use the mixtures of 3',4'-dichloropropionanilide with thiolcarbamates on crops on which the thiolcarbamates could not be used alone. Under the preferred conditions of application, that is to the established plants, the governing component of the mixtures of this invention as far as crop tolerance is concerned is 3',4'-dichloropropionanilide. It is, therefore, possible to use these mixtures on such valuable and varied crops as cereal grains, forage and turf grasses, peppers, and mints and to take advantage of the herbicidal properties of the thiolcarbamates without damage thereto, a consideration which was not heretofore possible.

When 3',4'-dichloropropionanilide is used alone as a herbicide, it exhibits excellent initial weed control in those crops tolerant to it at low and economical dosages, but in many instances it lacks persistency, and reapplications at short intervals, as little as three weeks, have been necessary. Naturally, for economic reasons, the fewer the number of herbicidal treatments needed, the better. Also, there are situations, such as in tomato and potato fields, where the plant growth habits are such that the plants vine out over the ground and make it impossible to get ground equipment into the fields to apply herbicides or to remove the weeds.

It thus now becomes possible to dispense with hand cultivation and hand weeding.

The herbicidal compositions of this invention are particularly useful in that practical weed control is obtained with the first application and lasts for the entire growing season—as long as four months. Aside from soil sterilization, it is uncommon to have such prolonged herbicidal activity.

I claim:

1. A herbicidal composition comprising an admixture of 3',4'-dichloropropionanilide and at least one thiolcarbamate of the formula

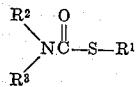

wherein R[1] is a member of the class consisting of alkyl, alkenyl, cyanoalkyl, alkoxyalkyl, and alkylthioalkyl groups, these groups each having not over five carbon atoms, cycloalkyl groups of five to six carbon atoms, and benzyl and phenyl groups, wherein, when $R^2$ and $R^3$ are taken individually, $R^2$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, and benzyl and phenyl groups and $R^3$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, the furfuryl group and the group $$-C_nH_{2n}(R^2)NC(O)SR^1$$

wherein $n$ has a value of two to three and $R^1$ and $R^2$ are as above defined, and when $R^2$ and $R^3$ are taken together, they form a divalent aliphatic radical which together with the nitrogen atom forms a heterocycle from the class consisting of morpholino, pyrrolidino, and piperidino rings, said 3′,4′-dichloropropionanilide and said thiolcarbamate being present in said composition in amounts and proportions sufficient to provide in the presence of each other control of growth of weed seeds, germinant weed seedlings, weed seedlings, and weed plants.

2. Compositions according to claim 1 wherein the weight ratio of 3′,4′-dichloropropionanilide to thiolcarbamate is 5:1 to 1:10.

3. A herbicidal composition comprising an admixture of 3′,4′-dichloropropionanilide and ethyl N,N-di-n-propylthiolcarbamate in a weight ratio from 5:1 to 1:10, said 3′,4′-dichloropropionanilide and said ethyl N,N-di-n-propylthiolcarbamate being present in said composition in amounts and proportions sufficient to provide in the presence of each other control of growth of weed seeds, germinant weed seedlings, weed seedlings, and weed plants.

4. A herbicidal composition comprising an admixture of 3′,4′-dichloropropionanilide and 2,3-dichloroallyl N,N-diisopropylthiolcarbamate in a weight ratio from 5:1 to 1:10, said 3′,4′-dichloropropionanilide and said 2,3-dichloroallyl N,N-diisopropylthiolcarbamate being present in said composition in amounts and proportions sufficient to provide in the presence of each other control of growth of weed seeds, germinant weed seedlings, weed seedlings, and weed plants.

5. A herbicidal composition comprising an admixture of 3′,4′-dichloropropionanilide and methoxymethyl N,N-di-n-propylthiolcarbamate in a weight ratio from 5:1 to 1:10, said 3′,4′-dichloropropionanilide and said methoxymethyl N,N-di-n-propylthiolcarbamate being present in said composition in amounts and proportions sufficient to provide in the presence of each other control of growth of weed seeds, germinant weed seedlings, weed seedlings, and weed plants.

6. A method for controlling undesired vegetation in an agronomic crop which comprises applying to weed seedlings among said crop an amount of a composition phytocidal to said seedlings and non-herbicidal to said crop, said composition comprising an admixture of 3′,4′-dichloropropionanilide and at least one thiolcarbamate of the formula

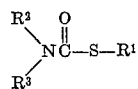

wherein $R^1$ is a member of the class consisting of alkyl, alkenyl, cyanoalkyl, alkoxyalkyl, and alkylthioalkyl groups, these groups each having not over five carbon atoms, cycloalkyl groups of five to six carbon atoms, and benzyl and phenyl groups, wherein, when $R^2$ and $R^3$ are taken individually, $R^2$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, and benzyl and phenyl groups and $R^3$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, the furfuryl group and the group $-C_nH_{2n}(R^2)NC(O)SR^1$ wherein $n$ has a value of two to three and $R^1$ and $R^2$ are as above defined, and when $R^2$ and $R^3$ are taken together, they form a divalent aliphatic radical which together with the nitrogen atom forms a heterocycle from the class consisting of morpholino, pyrrolidino, and piperidino rings, said 3′,4′-dichloropropionanilide and said thiolcarbamate being present in said composition in amounts and proportions sufficient to provide in the presence of each other control of growth of weed seeds, germinant weed seedlings, weed seedlings, and weed plants and said composition being applied at a rate between about one and about twelve pounds per acre.

7. A method according to claim 6 in which the composition has a weight ratio from 5:1 to 1:10 of 3′,4′-dichloropropionanilide to thiolcarbamate.

8. A method according to claim 7 in which the composition is applied at a rate between about 2 and about 8 pounds per acre of admixture of 3′,4′-dichloropropionanilide and thiolcarbamate.

9. A herbicidal composition in the form of an emulsion concentrate comprising (1) 3′,4′-dichloropropionanilide, (2) at least one thiolcarbamate, (3) an emulsifying agent, and (4) an organic solvent, the weight ratio of 3′,4′-dichloropropionanilide and thiolcarbamate being 5:1 to 1:10, the 3′,4′-dichloropropionanilide and said thiolcarbamate together constituting 20% to 75% of the composition by weight, the emulsifying agent constituting two to ten percent of the composition by weight, and the organic solvent constituting 23% to 78% of the composition by weight, said thiolcarbamate being of the formula

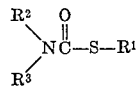

wherein $R^1$ is a member of the class consisting of alkyl, alkenyl, cyanoalkyl, alkoxyalkyl, and alkylthioalkyl groups, these groups each having not over five carbon atoms, cycloalkyl groups of five to six carbon atoms, and benzyl and phenyl groups, wherein, when $R^2$ and $R^3$ are taken individually, $R^2$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, and benzyl and phenyl groups and $R^3$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, the furfuryl group and the group $$-C_nH_{2n}(R^2)NC(O)SR^1$$

wherein $n$ has a value of two to three and $R^1$ and $R^2$ are as above defined, and when $R^2$ and $R^3$ are taken together, they form a divalent aliphatic radical which together with the nitrogen atom forms a heterocycle from the class consisting of morpholino, pyrrolidino, and piperidino rings.

10. A herbicidal composition according to claim 9 wherein the thiolcarbamate is ethyl N,N-di-n-propylthiolcarbamate.

11. A herbicidal composition in the form of a wettable powder comprising (1) 3′,4′-dichloropropionanilide, (2) at least one thiolcarbamate, (3) at least one surfactant, and (4) a carrier, the weight ratio of 3',4'-dichloropropionanilide and thiolcarbamate being 5:1 to 1:10, the 3',4'-dichloropropionanilide and said thiolcarbamate together constituting 20% to 80% of the composition by weight, the surfactant constituting one to ten percent of the composition by weight, and the carrier constituting 10% to 79% of the composition by weight, said thiolcarbamate being of the formula

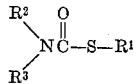

wherein $R^1$ is a member of the class consisting of alkyl, alkenyl, cyanoalkyl, alkoxyalkyl, and alkylthioalkyl groups, these groups each having not over five carbon atoms, cycloalkyl groups of five to six carbon atoms, and benzyl and phenyl groups, wherein, when $R^2$ and $R^3$ are taken individually, $R^2$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, and benzyl and phenyl groups and $R^3$ is a member of the class consisting of alkyl, haloalkyl, cyanoalkyl, hydroxyalkyl, alkenyl, haloalkenyl, and alkoxyalkyl groups, these groups each having not over five carbon atoms, hydrogen, cycloalkyl groups of five to six carbon atoms, the furfuryl group and the group —$C_nH_{2n}(R^2)NC(O)SR^1$ wherein $n$ has a value of two to three and $R^1$ and $R^2$ are as above defined, and when $R^2$ and $R^3$ are taken together, they form a divalent aliphatic radical which together with the nitrogen atom forms a heterocycle from the class consisting of morpholino, pyrrolidino, and piperidino rings.

12. A herbicidal composition according to claim 11 in which the thiolcarbamate is ethyl N,N-di-n-propylthiolcarbamate.

References Cited in the file of this patent
UNITED STATES PATENTS 3,037,853    Luckenbaugh _____ June 5, 1962

FOREIGN PATENTS 1,039,779    Germany _____ Sept. 25, 1958

OTHER REFERENCES

Sheets, in "Weeds," vol. 7, No. 4, October 1959, pages 442 to 448.